March 21, 1950     P. O. STEVENS     2,501,146
SUCKLING DEVICE FOR CALF FEEDERS
Filed Sept. 11, 1946
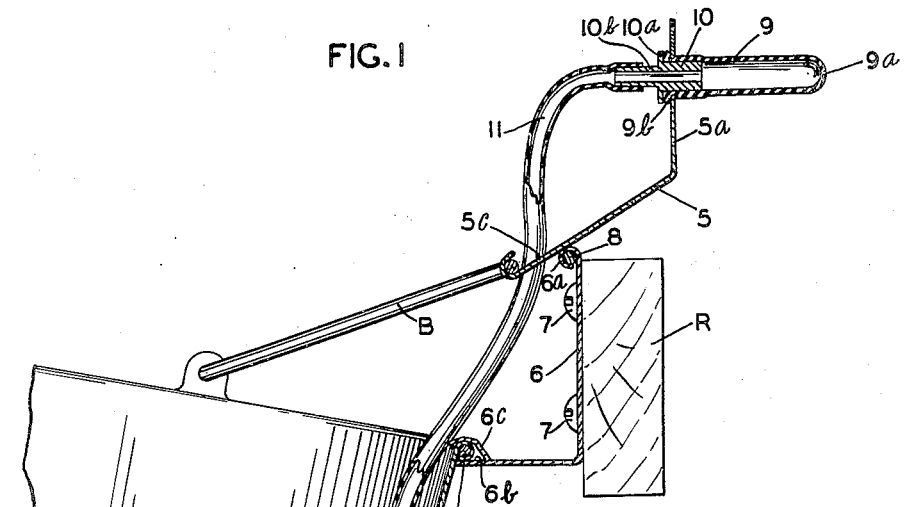
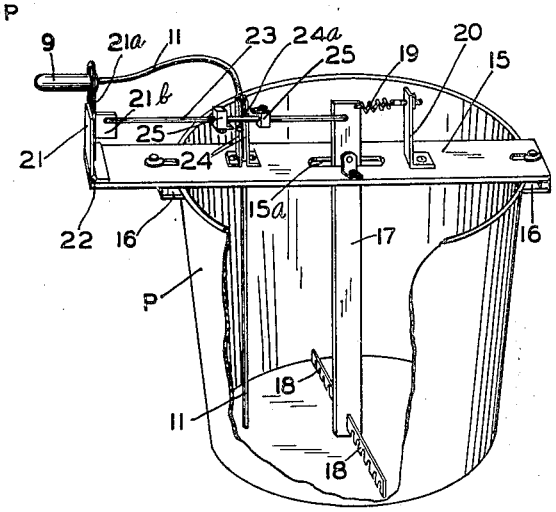
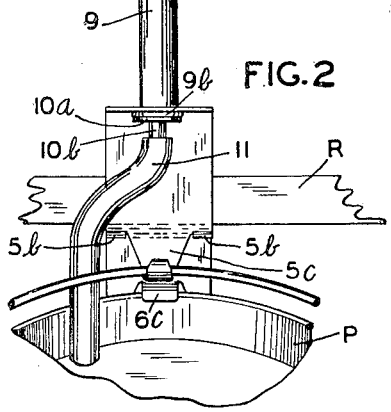
Inventor
PAUL O. STEVENS
By Williamson & Williamson
Attorneys Patented Mar. 21, 1950

2,501,146

UNITED STATES PATENT OFFICE 2,501,146

SUCKLING DEVICE FOR CALF FEEDERS

Paul O. Stevens, Minneapolis, Minn., assignor to Mutual Products Company, Minneapolis, Minn., a partnership Application September 11, 1946, Serial No. 696,087

9 Claims. (Cl. 119—71)

This invention relates to devices for feeding suckling calves and other young animals from a pail or other container supplied with a liquid food mixture, usually containing solid food particles in partial suspension but having the characteristics of gradually settling unless the mixture is mildly agitated.

At the present time, dairymen find it profitable to feed young calves large quantities of prepared food mixture containing skimmed milk in solid or liquid form, supplemented with other ingredients in comminuted, solid form essential to the diet. It has been found advantageous to feed the calf independently of the mother as early as possible after birth in order that the mother's milk may be made available for cream and butter for human consumption.

Suckling feeding pails and other suckling devices adapted to be associated with the pail and to draw the contents therefrom, have been heretofore utilized. Applicant is the inventor of the calf feeding pail disclosed in an application for United States Letters Patent S. N. 600,149, filed June 18, 1945, now abandoned, and is also the inventor of a suckling device for calves disclosed in application for United States Letters Patent, S. N. 655,710, filed March 20, 1946. The devices disclosed in both of said prior applications have proven satisfactory for the purposes intended; have been efficient in operation, simple in construction and have fulfilled most requirements. They do not however, make provision for agitation of the contents of a pail or other container to prevent the solid ingredients of the mixture from settling, in the course of time.

It is an object of my present invention to provide a highly simplified, efficient suckling feeder for calves and the like which is independent of a container or pail and which may be readily and very quickly associated with conventional pails and containers now in use, to enable a calf to suck the contents therefrom and to, moreover, cause in the natural feeding action of a calf, the contents of the container to be agitated to maintain suspension of the solid food ingredients within the liquid so that uniform feeding of the entire mixture is assured.

More specifically, it is an object to provide in suckling mechanism of the class described, a nipple mounting having means for engagement with a container and including a shiftable element to which the protruding nipple is affixed, in combination with agitating connections adapted during the natural action of feeding of the calf, to agitate the contents of the container to prevent settling of the solid particles in the mixture.

In the course of feeding by sucking action from a nipple, a calf or other young animal moves its head, pulls upon the nipple and alternately withdraws and sometimes butts against the nipple-supporting element or udder of the natural animal.

It is another object of my invention to utilize the natural movements and actions of the calf in feeding, to intermittently shift or reciprocate mechanism for mechanically joggling the pail to agitate the contents of the same or for shifting or reciprocating a mechanical agitation element disposed within the contents of the pail.

In the preferred form of my invention, it is an object, as far as possible, to ingeniously utilize some of the parts inherent in conventional pails now widely used in combination with a minimum number of parts for producing a joggling of the pail when the animal feeds.

These and other objects and advantages of my invention will be more apparent from the following description made in connection with the accompanying drawings wherein like reference characters refer to similar parts throughout the several views and in which:

Fig. 1 is a vertical section taken longitudinally through an embodiment of my preferred apparatus applied to a milk pail of conventional construction;

Fig. 2 is a fragmentary top plan view of the same; and

Fig. 3 is a perspective view of a somewhat different form of my invention with a portion of the pail broken away to show the agitator element mounted therein.

Referring now to the form illustrated in Figs. 1 and 2, I provide a two part nipple supporting mounting comprising a reciprocating shiftable element such as a hinged plate 5 hinged on a horizontal axis to an angular attachment bracket 6 which may be secured by screws 7 or other attachment elements to a horizontal rail or board R suitably mounted some distance above the ground. The swingable plate 5, as shown, is bent at an obtuse angle to provide an upstanding nipple-supporting portion 5a provided with a central circular aperture wherein the nipple is seated and secured. The lower portion of plate 5 as shown, has turned, marginal tongues 5b cooperating with and disposed outwardly of a turned, upper edge 6a on the upstanding portion of attachment bracket 6, to form with pintle pin 8, a hinge connection. Plate 5 is extended at its lower and medial portion to form an agitating connection or link 5c which is upturned at its lower end to form a hook for connection with the bail B of a conventional milk pail P.

At the outer edge of the lower and substantially horizontal arm of bracket 6, a channel 6b is formed, for receiving the upper, outwardly extending reinforced bead X of a conventional pail. Channel 6b may be formed, as shown, in Fig. 2, by slitting and upsetting a central tongue 6c of the stock of the metal bracket 6 to cooperate with the bifurcated portion left at the outer edge of the horizontal arm whereby the bead of the pail may be grasped and swingably received, the channel acting as a fulcrum for the minor swinging reciprocations imparted to the pail through the connection of my mechanism during normal feeding of the calf. The relationship of the fulcrum so provided with the position of the hinge pintle 8 and length of the agitating connection tongue 5c, is substantially, as shown in Fig. 1, the extension 5c being of such length that the weight of the pail and its contents urges the lower portion of plate 5 into a neutral position not far out of alignment with the general plane of the bail B causing the angled upper portion 5a of the mounting plate to be normally disposed in substantially a vertical position.

A nipple in the form of an elongated, integrally formed rubber teat 9 having an axial aperture 9a in the outer end thereof, is secured to the apertured portion of the upstanding part of plate 5a extending through the aperture and being, in external diameter, substantially equal to the internal diameter of the centrally apertured plate.

Retaining plug 10 is preferably constructed from solid, non-corrosive material such as metal or plastic or hardened rubber and is forced into the open end of nipple 9 axially of the aperture in plate portion 5a and is preferably slightly tapered in shape to distend the engaged end of the nipple and force the same securely into clamping engagement with the annular edge defined by the aperture. In this connection, nipple 9 is provided with an annular bead or reinforcement 9b at its open end which is clamped between an outturned flange 10a carried by the plug 10 and the annular edge defined by the aperture. Plug 10 carries or has integrally formed therewith, a diminished extension 10b co-axial therewith, to which as shown, the upper end of a flexible conduit 11 is telescopically secured. Conduit 11 is preferably constructed of rubber or other elastic and flexible material, to facilitate such connection and as shown, depends from the plug into the associated pail P, being preferably guided and held beneath the bail B with its lower extremity disposed just above the bottom of the pail.

In feeding, nipple 9, it will be noted, is disposed for convenient access to the calf or suckling animal. The jerking head movement and sometimes butting against the nipple and plate portion 5a, as well as pulling upon the nipple, causes reciprocation of swingable plate 5, in so doing, alternately imparting pull and release upon the bail B of the pail. In such action, pail P is reciprocated by swinging slightly upon the fulcrum provided by channel 6 thereby swishing the contents of the pail and efficiently agitating the same. The comminuted solid particles within the liquid mixture are partially suspended in the liquid contents normally and only slight agitation is necessary to maintain a proper suspension for uniform feeding of the entire contents.

In extensive, actual use, my described structure has demonstrated a very high efficiency for the purposes intended and the proper suspension is maintained during full consumption of the mixture within the pail.

It will be noted that with the structure of Figs. 1 and 2, only a minimum of additional parts are required for properly mounting the nipple and providing the actuating connections with the pail. The bead of the pail itself, forms a fulcrum medium and the bail of the pail cooperates with the agitating link 5c of the plate 5 to complete the agitating mechanism and connections. The construction described and connection with the parts of the pail cause the weight of the pail and its contents to normally maintain the plate 5 in a neutral position, with the nipple-supporting end 5a disposed substantially vertically.

Attention is called to the simplified construction and mounting of the nipple including the clamping relation between the distending plug 10, the simplified nipple 9 with its bead 9b and the circularly apertured portion of plate 5a. The device lends itself to thorough and easy cleaning and sterilization.

In Fig. 3, a somewhat different form of the invention is illustrated wherein the movement of the calf's head in jerking, butting and manipulating the nipple is utilized to reciprocate a mechanical agitator disposed within the pail.

In this form, a mounting plate 15 is affixed to the top of a conventional pail P by suitable clamping means such as the clamp hooks 16 which engage beneath the upper bead of the pail. Within the medial portion of mounting plate 15, a swinging, reciprocating agitating arm 17 is pivotally mounted, the upper portion of said arm working through a slot 15a in the mounting plate. The lower end of arm 17 is positioned in close, spaced relation to the center of the bottom of the pail and carries suitable agitating blades 18 which, as shown, are diametrically disposed. The upper end of agitator arm 17 is urged rearwardly by a light coil spring 19 to neutral position, the outer end of spring 19 as shown, being adjustably secured to an upstanding attachment bracket 20.

As shown, the horizontal frame plate 15 is extended at one end beyond the pail and has swingably mounted thereon, an upstanding actuator and nipple-supporting plate 21, the transverse hinge construction being indicated by the number 22. Plate 21 carries an extension plate 21a which, near its upper end, is circularly apertured to receive a nipple construction 9 with its related parts identical in structure to the form illustrated in Figs. 1 and 2. The horizontal connecting link 23 is pivotally connected at one end to an angled lug 21b attached to plate 21 and is pivotally connected at its rear end to the upper end of agitator arm 17.

A flexible conduit 11 extends from the nipple, substantially radially of the pail above link 23 and is then guided vertically downward by an upstanding guide collar 24 affixed to the top of the plate 15, the end of conduit 11 being disposed just above the bottom of the pail.

To increase the head movement of the calf in feeding, I may provide on connecting link 23, a pair of spaced tube-checking elements 25, adjustably affixed by set screws or other means to the medial portion of link 23 and having inwardly and oppositely projecting tube-engaging teeth adapted to successively engage the guided portion of the tube through notches or slots 24a, appropriately cut therein. Thus, when the nipple 9 is pulled by the calf, the right hand tube-checking element 25 momentarily closes off suction on the tube, causing the calf to release his hold and often to toss his head or buck against plate 21 and likewise, in the opposite extreme position of swingable plate 21, the left hand tube-checking element engages the tube through the cooperating slot 24 to perform a similar function.

In the operation of the device of Fig. 3, the pulling action, butting, release and head movements of the calf cause reciprocation of the swingable plate 21, thereby in turn, through the agitator connections, swinging the lower end of agitator arm 17 and agitating the liquid mixture within the pail.

It will, of course, be understood that various changes may be made in the form, details, arrangement and proportions of the parts without departing from the scope of my invention.

What I claim is:

1. Suckling mechanism for feeding a liquid and solid food mixture from a container to young animals, having in combination, a mounting, a nipple-holding element supported on said mounting for shifting movement relative thereto through the movement of the head of the suckling animal during feeding, a nipple secured to said element and protruding therefrom and agitating mechanism engageable with said container and including an element connected with said shiftable element and movable therewith to cause agitation of the contents of said container when said shiftable element is moved.

2. Suckling mechanism for feeding a liquid and solid food mixture to young animals, having in combination a nipple-supporting mounting having means for engagement with a pail containing a liquid food mixture, said mounting having a shiftable element extending exteriorly of the pail, a nipple member supported from said element and protruding therefrom, a conduit connected to said nipple member and having its outer end adapted to be disposed within the contents of said pail to a point adjacent the bottom thereof and agitating mechanism independent of said conduit and connected with said shiftable element for agitating the contents of said pail to prevent settling of the solid particles when said shiftable element is moved during feeding.

3. The structure set forth in claim 2 and yieldable means for urging said shiftable element to a neutral position.

4. Suckling mechanism for feeding a liquid food mixture containing solid particles to young animals, having in combination a mounting member adapted to be connected with a conventional container for a liquid food mixture, a nipple-supporting element mounted for shifting movement upon said mounting member, a nipple secured to said element and protruding therefrom a conduit connected with said nipple for immersion into the contents of said container and agitating mechanism independent of said conduit connected with said shiftable element for agitating the contents of said container through the movement of the head of the suckling animal during feeding.

5. Suckling mechanism for feeding a liquid food mixture containing solid particles, to young animals, having in combination a pail-supporting member adapted to be connected with a conventional pail to permit swinging movement of said pail relative thereto, a nipple-supporting member mounted for shifting movement upon said pail-supporting member and having an actuating connector element for engagement with the bail of a conventional pail, a nipple secured to said nipple-supporting member and having a conduit connected therewith adapted to be submersed in the contents of said pail whereby shifting of said nipple-supporting element due to the natural movements of the head of a suckling animal during feeding causes the contents of said pail to be agitated.

6. Suckling mechanism for feeding a liquid food mixture containing solid particles to young animals, having in combination a bracket having a cooperating fulcrum element for engagement with means at the upper portion of a pail to facilitate movement of said pail thereon, a nipple-supporting member hinged on a horizontal axis to said bracket, a nipple secured to said member and protruding therefrom for accessibility to a suckling animal, a conduit extending from said nipple and depending therefrom with its lower end adapted to be submersed in the contents of a pail, said swingable nipple-supporting member having an actuating element connected therewith adapted to be detachably connected with the bail of a conventional pail to produce bodily swinging of said pail when said nipple-supporting element is reciprocated.

7. The structure set forth in claim 6 and said actuating element being disposed above said cooperating fulcrum element and extending substantially in a vertical plane therewith, whereby the weight of the pail and its contents yieldingly urge said hinged nipple-supporting member to a neutral position.

8. Suckling mechanism for feeding a liquid food mixture containing solid particles, to young animals, having in combination, a pail-fulcruming member having a substantially horizontal channel adapted to receive and fulcrum an annular edge such as the bead at the top of the conventional pail, a nipple-supporting member mounted in spaced relation to said channel and hinged on a horizontal axis disposed substantially parallel to said channel, said nipple-supporting member having an extension for connection with said pail at a point eccentric of said annular edge, a nipple secured to said swingable member and protruding therefrom for accessibility to a suckling animal whereby swinging of said nipple-supporting member due to the natural head movement of a suckling animal during feeding effects swingable reciprocation of said pail to agitate the contents thereof.

9. Suckling apparatus for feeding a liquid and solid food mixture to young animals, having in combination a member for supporting at least a portion of the weight of a pail with freedom for the pail to swing thereon, a nipple-holding member mounted above said pail-supporting member for swinging movement on a horizontal axis, a nipple secured to said nipple-holding member and a pail-swinging member connected to said nipple-holding element and having an outer end for connection with said pail at a point eccentric of said pail-supporting member whereby shifting of said nipple-holding element during feeding, produces swinging of said pail and agitation of the contents therein.

PAUL O. STEVENS.

REFERENCES CITED

The following references are of record in the file of this patent:

UNITED STATES PATENTS

| Number | Name | Date |
|---|---|---|
| 697,304 | Whitford | Apr. 8, 1902 |